(12) United States Patent
Rocchi et al.

(10) Patent No.: US 10,144,098 B2
(45) Date of Patent: Dec. 4, 2018

(54) METHOD FOR PRODUCING A CORRUGATED FOIL BEARING STIFFENER AND OBTAINED STIFFENER

(71) Applicant: LIEBHERR-AEROSPACE TOULOUSE SAS, Toulouse (FR)

(72) Inventors: Jerome Rocchi, Roqueserieres (FR); Gregory Grau, Castelmayran (FR); Frederic Letrange, Balma (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 362 days.

(21) Appl. No.: 14/888,534

(22) PCT Filed: Apr. 29, 2014

(86) PCT No.: PCT/FR2014/051021
§ 371 (c)(1),
(2) Date: Nov. 2, 2015

(87) PCT Pub. No.: WO2014/184460
PCT Pub. Date: Nov. 20, 2014

(65) Prior Publication Data
US 2016/0082554 A1 Mar. 24, 2016

(30) Foreign Application Priority Data
May 16, 2013 (FR) .................................... 13 54402

(51) Int. Cl.
*B23P 15/00* (2006.01)
*F16C 17/02* (2006.01)
(Continued)

(52) U.S. Cl.
CPC ............ *B23P 15/003* (2013.01); *B21D 15/02* (2013.01); *F16C 17/024* (2013.01); *F16C 33/14* (2013.01)

(58) Field of Classification Search
CPC ..... B23P 15/003; B21D 53/261; B21D 15/02; F16C 33/00; F16C 33/14; F16C 17/024
See application file for complete search history.

(56) References Cited

U.S. PATENT DOCUMENTS 3,124,090 A * 3/1964 Zatyko ................. B21D 53/261
72/58
4,277,113 A * 7/1981 Heshmat ............... F16C 17/024
384/124
(Continued)

FOREIGN PATENT DOCUMENTS

FR 2 670 545 A1 6/1992
FR 2 700 821 A1 7/1994

OTHER PUBLICATIONS

Special Metals; Inconel Alloy X-750; Sep. 2004; pp. 1-27.*
International Search Report, dated Jul. 7, 2014, from corresponding PCT application.

*Primary Examiner* — Sarang Afzali
*Assistant Examiner* — Lee A Holly
(74) *Attorney, Agent, or Firm* — Young & Thompson

(57) ABSTRACT

A method for producing a corrugated foil bearing stiffener involves starting with an austenitic nickel superalloy sheet (15) having an elasticity limit higher than 500 MPa, and subjecting the sheet (15) to at least one step of press bending plastic deformation of the entire thickness of same with a deformation energy higher than 10 kJ in a time shorter than $10^{-5}$ s in such a way as to create corrugations.

14 Claims, 2 Drawing Sheets

(51) Int. Cl.
*B21D 15/02* (2006.01)
*F16C 33/14* (2006.01)

(56) References Cited

U.S. PATENT DOCUMENTS

| | | | |
|---|---|---|---|
| 4,385,787 A | | 5/1983 | Reisenweber et al. |
| 4,562,039 A | | 12/1985 | Koehler |
| 7,954,357 B2 | * | 6/2011 | Bradley ................ B21D 26/14 72/466.8 |
| 2011/0033142 A1 | | 2/2011 | Kim et al. |

* cited by examiner

METHOD FOR PRODUCING A CORRUGATED FOIL BEARING STIFFENER AND OBTAINED STIFFENER

The invention concerns a method for producing a corrugated foil-bearing stiffener; it extends to the stiffener obtained by this method.

BACKGROUND OF THE INVENTION

In the present text, "foil bearing" designates a radial bearing or an axial thrust bearing including foils enabling a fluid film for levitation to be created, enabling the rotation of one component in relation to another by means of this fluid film, in particular a gas, and more specifically air. Such foil bearings are generally used for very high speeds of rotation and relatively low axial or radial loads in comparison with the loads supported by other types of bearing (ball bearings or hydrodynamic bearings, for example).

Such foil bearings (cf. for example FR 2 670 545, FR 2 700 821 etc.) are generally constituted by a first component on which elastic foils are fixed by an edge which is oriented orthogonally to the direction of rotation, the opposite edge of which extends, in the direction of rotation, in the direction of the second component, in order to realize, when the assembly is set in rotation, an "air wedge" enabling the levitation of the second component in relation to the first component to be ensured. Each foil is maintained at a distance from the first component by at least one corrugated stiffener interposed between the foil and said first component.

Such corrugated stiffeners are extremely sensitive components and have to display particularly elevated mechanical characteristics, notably a tensile strength greater than 1000 MPa, a 0.2% yield strength greater than 700 MPa, a minimum elongation greater than 20%, and a hardness (on the section) greater than 390 HV.

In order to display such characteristics combined with the presence of the corrugations, the known methods for producing these corrugated stiffeners are lengthy and costly. They consist in plastically deforming a plane sheet consisting of metallic superalloy with structural hardening (by precipitation) by stamping, in order to form the corrugations therein, then in winding the sheet corrugated in this way between two cylindrical rings in the form of a cylindrical solid of revolution, and in realizing a heat treatment for hardening said sheet (typically at more than 700° C. over a period of at least 20 h) to obtain the desired mechanical characteristics. U.S. Pat. No. 4,277,113 describes starting from a foil of annealed Inconel X-750, splitting and forming this foil in a die to obtain the corrugations, lining this foil afterwards with a layer of copper, and subjecting the assembly to a heat treatment at more than 700° C. for 20 hours, enabling a high resistance to the temperatures at the Inconel to be obtained, and obtaining the diffusion of the copper into the upper portion of the foil.

These known methods present various drawbacks. First of all, they impose manipulations, both of the corrugated sheet after stamping and also of the tools for heat treatment, which are lengthy, costly and particularly delicate, in order to avoid any untimely localized deformation of the shape of the corrugations obtained by stamping. In addition, the final heat treatment for structural hardening, which is necessary with a superalloy having structural hardening, is a costly and energy-consuming operation. These known methods cannot therefore be exploited on an industrial scale in mass-production applications, such as in the field of the manufacture of automobiles, for example.

SUMMARY OF THE INVENTION

The invention therefore aims to overcome these drawbacks by proposing a production method that is reliable, quick, inexpensive, that minimizes the manipulations of the corrugated stiffeners, and that is compatible with exploitation on an industrial scale in mass production.

In order to do this, the invention concerns a method for producing a corrugated foil-bearing stiffener, in which:
- the starting-point is a sheet consisting of nickel-based austenitic metallic superalloy,
- the sheet is plastically deformed in order to impart thereto the shape of the corrugated stiffener, wherein:
- a sheet is chosen consisting of nickel-based austenitic superalloy exhibiting a yield strength greater than 500 MPa,
- the sheet is subjected to at least one step of plastic flexural deformation by stamping along its entire thickness with a deformation energy greater than 10 kJ within a period shorter than $10^{-5}$ s, so as to create flexural corrugations.

The inventors have in fact established with surprise that it is in fact possible to do totally without lengthy and costly operations of heat treatment, and to obtain a corrugated stiffener by at least one step—notably a single step—of plastic flexural deformation by stamping, at very high speed and very high energy, of a sheet consisting of austenitic nickel-based superalloy having high characteristics, notably exhibiting a yield strength greater than 500 MPa, preferably greater than 700 MPa. In fact, it turns out that in the course of such a plastic flexural deformation at very high speed and very high energy by stamping, in order to realize corrugations from plastic flexural deformation of the sheet, such a superalloy is flexurally deformed with a homogenization of the stresses in the material and substantially without the phenomenon of elastic return after deformation, enabling extremely precise dimensional characteristics and mechanical properties to be obtained, and eliminates the necessity to carry out a thermal hardening treatment and/or a thermal relaxation treatment after deformation. Whereas a heat treatment for hardening and/or for relaxation of a superalloy after plastic flexural deformation is considered absolutely indispensable, a method according to the invention makes it possible, on the contrary and against all expectations, to do without any heat treatment of the superalloy after plastic deformation in order to realize the corrugations of the stiffener. Said method also makes it possible to do without any subsequent forming step, it being possible for the final shape of the stiffener to be obtained in a single step of plastic flexural deformation by stamping, at very high speed and very high energy, of a sheet consisting of austenitic nickel-based superalloy, without elastic return after deformation.

It should be noted in this respect that a method according to the invention, in which flexural corrugations are realized by plastic deformation of a sheet, is distinguished from the methods for superficial forming of components or for autofrettage of tubes, which only bring about plastic compressive deformations over a part of the thickness, in general a small part, of the component, and in which such heat treatments are not always necessary and are even harmful to the effect being sought of creating differential residual stresses in the thickness.

In particular in a method according to the invention, use may be made of a sheet consisting of superalloy having been the subject beforehand of a thermal hardening treatment—notably for structural hardening (by precipitation)—in order to impart thereto the mechanical characteristics desired for the corrugated stiffener, the plastic flexural deformation to which the sheet is then subjected not substantially affecting its mechanical characteristics. In this way, the invention makes it possible, in particular, to undertake tests of quality control and of mechanical characteristics on the sheet before subjecting it to the plastic flexural deformation, without risk of deterioration of the geometry of the corrugated stiffener on account of these tests.

Advantageously and according to the invention, a sheet is chosen consisting of superalloy exhibiting a yield strength greater than 700 MPa, a tensile strength greater than 1000 MPa, and an elongation at break greater than 20%.

Various compositions of nickel-based superalloy—notably including more than 50% nickel—may be envisaged within the scope of a method according to the invention. More particularly, advantageously and according to the invention a sheet is chosen consisting of superalloy comprising between 5% and 9% iron, more than 70% nickel and cobalt, of which at most 1% is cobalt, between 14% and 17% chromium. This superalloy may be of the type with structural hardening (by precipitation) and then also includes aluminum and titanium, notably between 0.4% and 1% aluminum and between 2.25% and 2.70% titanium. In this way, advantageously and according to the invention a superalloy is chosen including, in addition, less than 0.08% carbon, less than 0.3% manganese, less than 0.5% silicon, less than 0.01% sulfur, between 0.4% and 1% aluminum, between 2.25% and 2.70% titanium, less than 0.5% copper, and between 0.7% and 1.2% niobium and tantalum. For example, a sheet is advantageously chosen consisting of Inconel® superalloy—notably consisting of Inconel® X-750 superalloy.

It should be noted, however, that it is an advantage of the invention to enable the use of a superalloy not necessarily exhibiting a structural hardening, since the mechanical characteristics of the stiffener are obtained even before the step of plastic flexural deformation.

The dimensions of the sheet and of the corrugations realized by plastic flexural deformation at high speed and high energy are chosen as a function of those of the corrugated stiffener to be produced. In certain embodiments, advantageously and according to the invention a plane sheet is chosen having a thickness of between 0.05 mm and 0.4 mm, and flexural corrugations are realized having a height of each corrugation of between 0.2 mm and 1 mm, a length of each corrugation of between 3 mm and 10 mm, and a pitch between the corrugations of between 4 mm and 10 mm.

In addition, advantageously and according to the invention, in the course of said at least one step of plastic flexural deformation a coupling fold is also realized, forming an outer edge of the stiffener. The shapes and dimensions of this coupling fold are suitable to enable the coupling of the stiffener to a foil-bearing stator.

Furthermore, advantageously and according to the invention, in the course of said at least one step of plastic flexural deformation the sheet is subjected to a deformation energy of less than 35 kJ. In addition, the period of the step of plastic flexural deformation is advantageously longer than $10^{-10}$ s.

Several practical variants can be envisaged in order to obtain this range of speed and energy of plastic deformation. Use may be made, in particular, of various techniques of cold forging at high speed and high energy, for example by explosion and/or electromagnetic propulsion.

Advantageously and according to the invention, the sheet is deformed by stamping along a direction at least substantially normal to the sheet.

In order to do this, in a particularly advantageous embodiment according to the invention the sheet is wound in the form of a cylindrical solid of revolution between an external die, exhibiting an internal cylindrical face endowed with patterns in the form of troughs corresponding to the corrugations—and to the coupling fold—to be formed, and a cylindrical punch consisting of rubber elastomer, and said cylindrical punch is axially compressed, the radial expansion of the cylindrical punch bringing about the radial stamping of the sheet into the die in order to form said flexural corrugations. Advantageously and according to the invention, use is made of an elastomer exhibiting a Poisson ratio that is as high as possible, notably between 0.3 and 0.5 inclusive, more particularly of the order of 0.5. More particularly, advantageously and according to the invention said cylindrical punch is axially compressed with the aid of at least one piston having a mass greater than 200 g, which is driven axially at a speed greater than 10 m/s—notably by electromagnetic propulsion or by a device of the swage-hammer type, or with explosion in the manner of a heat engine; the plastic deformation may even be obtained by generation of a gaseous explosion directly within the sheet in the die, etc. Use may be made of a piston pounding the punch against a bottom of the die, or two pistons driven axially in opposite directions against the two axial ends of the punch, the bore of the die being a through-bore.

The invention extends to a stiffener obtained by a method according to the invention. The invention therefore concerns, in particular, a corrugated foil-bearing stiffener exhibiting a tensile strength greater than 1000 MPa, a 0.2% yield strength greater than 720 MPa, an elongation at break greater than 20%, and a hardness greater than 390 HV.

The invention also extends to a method for producing a foil bearing, in which a corrugated stiffener is produced from a sheet consisting of nickel-based austenitic metallic superalloy by plastically deforming the sheet in order to impart thereto the shape of the corrugated stiffener, and each corrugated stiffener is mounted in the bearing, wherein the corrugated stiffener is produced by implementation of a method for producing a corrugated stiffener according to the invention in accordance with a shape and dimensions enabling its mounting directly in the foil bearing, and wherein the corrugated stiffener resulting directly from this production method according to the invention is mounted in the foil bearing. In this way, the invention enables the production directly of a corrugated stiffener having the appropriate shapes and dimensions for its direct mounting in the foil bearing, without necessitating any intermediate step of heat treatment or of machining.

The invention also extends to a foil bearing including at least one corrugated stiffener according to the invention—that is to say, at least one corrugated stiffener obtained by a production method according to the invention.

The invention also concerns a method for producing a corrugated foil-bearing stiffener, a method for producing a foil bearing, and a foil bearing, which are characterized in combination by all or some of the characteristics mentioned above or below.

BRIEF DESCRIPTION OF THE DRAWINGS

Other objectives, characteristics and advantages of the invention will become apparent upon reading the following description which is given by way of non-limiting examples of embodiments of the invention and which refers to the appended figures, in which.

DETAILED DESCRIPTION OF THE PREFERRED EMBODIMENTS

In the figures the various scales are not observed, notably so far as the thickness of components is concerned, for purposes of illustration.

Figure 1:
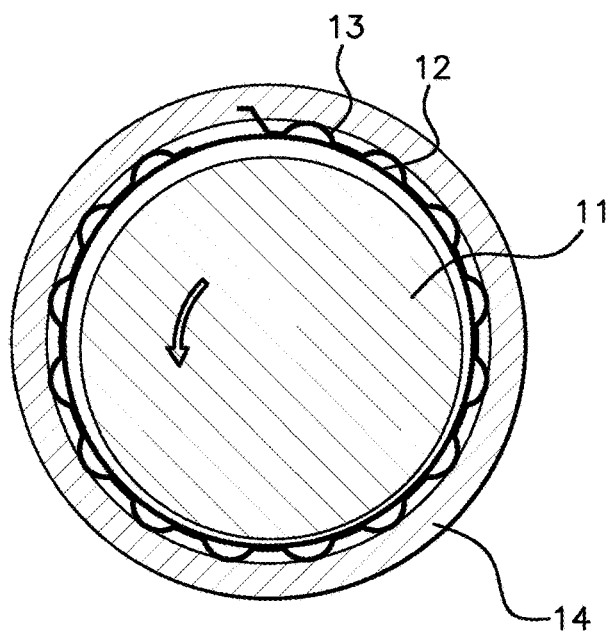
FIG. 1 is a schematic view, in cross section, of an example of a foil bearing.
Figure 2:
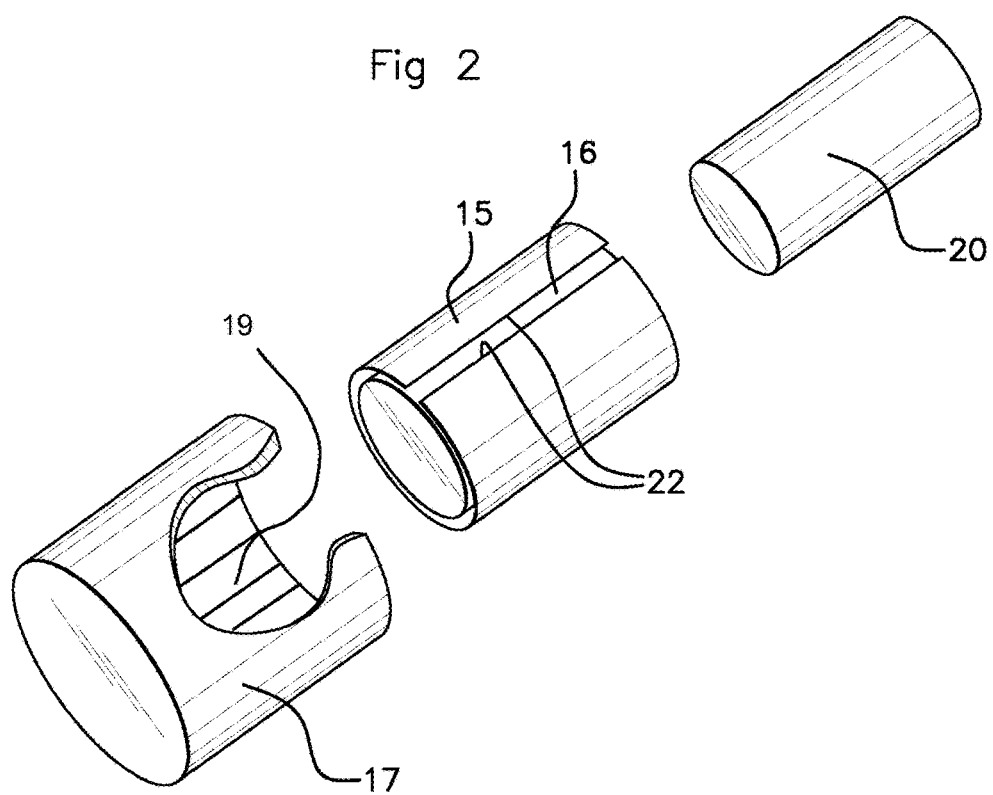
FIG. 2 is a schematic view, in exploded perspective, of a device enabling the implementation of a method according to the invention.

A radial foil bearing in the example represented in FIG. 1 comprises a rotor 11, an internal smooth foil 12, a corrugated foil 13 constituting a corrugated stiffener according to the invention, the whole in a sheath 14 in the form of a cylindrical solid of revolution serving as stator. In the case of an axial thrust bearing, the foils are arranged between two rotary disks. The invention is applicable to the realization of corrugated foil-bearing stiffeners such as the corrugated stiffener 13.

In order to implement a method according to the invention, the starting-point is a sheet 15 which is initially plane and which is constituted by a nickel-based austenitic superalloy exhibiting a yield strength greater than 500 MPa, preferably greater than 700 MPa, for example a 0.2% yield strength of the order of 720 MPa. In addition, this superalloy is chosen so that its tensile strength is greater than 1000 MPa, notably greater than 1034 MPa, for an elongation at break greater than 20%.

Advantageously, a sheet 15 is chosen consisting of superalloy comprising between 5% and 9% iron, more than 70% nickel and cobalt, of which at most 1% is cobalt, between 14% and 17% chromium, less than 0.08% carbon, less than 0.3% manganese, less than 0.5% silicon, less than 0.01% sulfur, between 0.4% and 1% aluminum, between 2.25% and 2.70% titanium, less than 0.5% copper, and between 0.7% and 1.2% niobium and tantalum. By way of example, use may be made of a plane sheet consisting of Inconel® X-750 having been the subject of a prior heat treatment for structural hardening—notably for at least 20 h at 700° C.—in order to enable it to achieve the aforementioned mechanical properties.

It should be noted that this sheet 15 may be the subject of various tests concerning the quality of its constituent material and its mechanical properties even before the implementation of a step of plastic flexural deformation according to the invention.

In order to produce a corrugated stiffener from such a sheet 15, this sheet 15 is wound in the form of a cylindrical solid of revolution around a punch 16 in the form of a cylindrical solid of revolution, the external circumference of which at rest is greater than or equal to the length of the sheet 15, so that this latter can be wound around the punch 16 without play or overlap in less than one turn. The wound sheet 15 therefore exhibits free outer edges 22 parallel to the axis of the punch 16 and at a distance from one another with a certain play. The punch 16 is made of elastic material in compression exhibiting a high Poisson ratio, notably greater than 0.4, preferably of the order of 0.5, for example a rubber elastomer.

Figure 3:
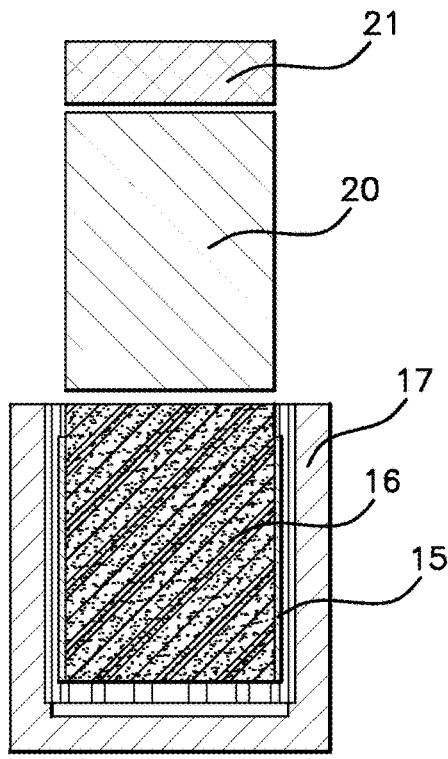
FIG. 3 is a schematic view, in axial section, of the device of FIG. 2 at the time of the positioning of the various constituent elements of said device prior to implementation of a step of plastic deformation according to the invention.

Afterwards the assembly is placed (FIG. 3) in a die 17 exhibiting a blind internal bore 18 which, taken as a whole, has the form of a cylindrical solid of revolution, the internal diameter of which corresponds at least substantially to the external diameter of the sheet 15 wound around the punch 16. The punch 16 is preferably slightly compressed radially by tightening the sheet 15 wound around said punch (reducing the play exhibited between the outer edges 22 of the sheet 15 opposite one another), in order to be able to introduce it into the bore 18, the internal diameter of which is slightly smaller than the external diameter of the sheet 15 wound around the punch 16. In this way, it is ensured that the punch is applied without play within the sheet 15, this latter being applied elastically and radially by the punch 16 against the internal face of the bore 18 of the die 17.

The bore 18 of the die 17 furthermore exhibits patterns 19 in the form of troughs, the shapes of which correspond to those of the corrugations being sought for the corrugated stiffener. These patterns 19 include grooves in the form of regular surfaces with generatrix parallel to the axis of symmetry of the bore 18. The cross section of the grooves of the patterns 19 corresponds to the shape of the cross section of the corrugations to be formed. The patterns 19 also include a groove (not represented) which is parallel to those forming the flexural corrugations, but deeper than these latter, and exhibiting a shoulder capable of forming a coupling fold 23 constituting an outer edge 22 of the stiffener 13, this coupling fold 23 enabling the coupling of the stiffener 13 in a recess of the sheath 14 of the bearing.

The axial length of the punch 16 is preferably greater than the axial length of the sheet 15 wound around said punch, and the axial depth of the bore 18 is itself greater than the axial length of the punch 16.

Figure 4:
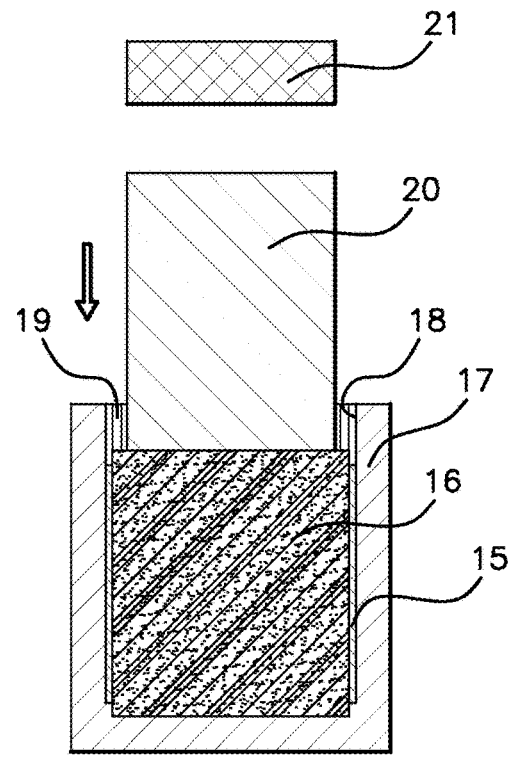
FIG. 4 is a schematic view, in axial section, of the device of FIG. 2 at the end of a step of plastic deformation according to the invention.

In order to form the flexural corrugations and the coupling fold 23, the punch 16 is axially compressed in the die 17 by axially displacing a piston 20 against the free axial end of the punch 16. The axial compression of the punch 16 between the piston 20 and the bottom of the die 17 brings about a radial expansion of said punch which plates the sheet 15 into the patterns 19 in the form of troughs of the bore 17 and brings about a plastic flexural deformation by stamping of said sheet (FIG. 4).

The mass of the piston 20 and the device 21 which drives it axially in order to pound the punch 16 are chosen so as to develop an energy of plastic flexural deformation of the sheet 15 of between 10 kJ and 35 kJ within a period of between $10^{-10}$ s and $10^{-5}$ s.

In practice, use is made of an electrically conductive solid metallic piston 20 with electrical resistivity as low as possible and having a mass greater than or equal to 200 g. This piston 20 is driven axially at a speed greater than 100 m/s by a device 21 which is an electromagnetic-pulse generator such as those used in electromagnetic forming (named EMF, cf. U.S. Pat. No. 7,954,357 for example).

This generator 21 makes it possible to discharge abruptly in at least one coil, with the aid of a high-speed commutator, a very large amount of energy (100 kA to 1000 kA) stored in capacitors. This instantaneous discharge creates a magnetic-field pulse in the coil, which generates an induced current in the region of the electrically conductive piston 20. The interaction between the magnetic-field pulse and the magnetic field resulting from the current induced in the piston causes an abrupt and high-speed displacement of the piston 20 which in this way comes to strike the punch 16.

The metallic material constituting the piston 20 is chosen to exhibit an electrical resistivity that is as low as possible and to obtain the mechanical characteristics of the piston 20 enabling it to resist the impact on the punch 16. It may be a question, for example, of a stainless steel with treatment for hardening of its surface, such as Z160CDV12 with a surface hardness greater than or equal to 56 HRC.

Aside from the outputs, the principles that govern these electromagnetic pulses are the following.

The mechanical energy developed by the electromagnetic-pulse generator 21 corresponds to the kinetic energy of the piston, which is equal to $½*MP*VP^2$, MP being the mass of the piston, and VP being the speed of the piston.

The power supplied by the generator 21 corresponds to this mechanical energy divided by the period of the electromagnetic pulse. This power is also the product of the electrical voltage and the intensity of the current passing through the coil of the generator 21.

In this way, for example, if it is desired to develop a mechanical energy of 10 kJ, with a mass of the piston of the order of 200 g, the speed of this latter has to be 316 m/s. For a supply voltage of the generator 21 equal to 9 kV and an intensity of 100 kA, the power is 900 MW for an electromagnetic-pulse period of $1.11 \cdot 10^{-5}$ s.

Example

Plane sheets 15 consisting of Inconel® X-750 are chosen having the following dimensions: length: 110 mm; width: 30 mm; thickness: 0.1 mm.

Each plane sheet 15 has been the subject of a prior heat treatment for structural hardening for at least 20 h at 700° C., and displays the following mechanical characteristics, verified by tensile tests and hardness tests made on one of them: tensile strength greater than 1000 MPa; 0.2% yield strength greater than 700 MPa; elongation at break greater than 20%; hardness greater than 390 HV.

Such a sheet 15 is wound around a punch 16 consisting of rubber elastomer in the form of a cylindrical solid of revolution having the following dimensions: diameter at rest 35 mm; axial height: 34 mm.

The assembly formed in this way is introduced into a die 17 composed of steel having the following dimensions: internal diameter of the bore 18: 36.5 mm; axial depth of the bore 18: 36 mm; thickness of the peripheral walls and of the bottom: 5 mm. The bore 18 is provided with sixteen grooves in the form of troughs each having the following dimensional characteristics: radius of curvature 4 mm, axial height 36 mm, total depth 0.55 mm. One of the outer edges of the sheet 15 is placed opposite a groove forming a shoulder having a depth of 0.7 mm, which enables a coupling fold 23 of the stiffener 13 to be formed in the sheath 14.

Use is made of an electromagnetic-pulse generator 21 to displace a metallic piston 20 of 200 g at a speed of impact on the punch 16 of about 300 m/s—that is to say, a deformation energy equal to 10 kJ within a period equal to about $10^{-5}$ s.

Figure 5:
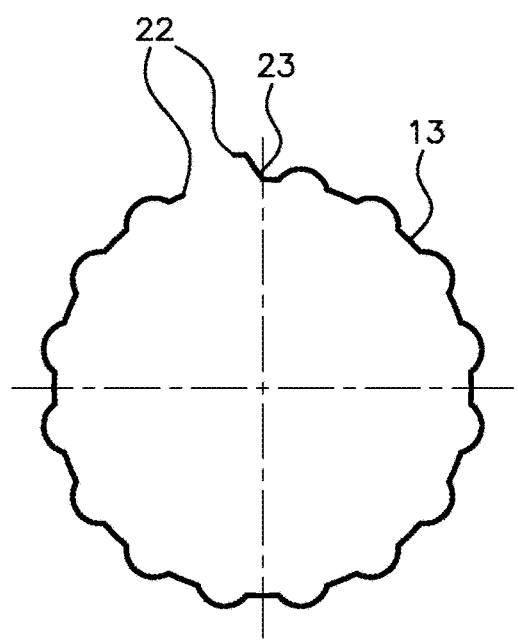
FIG. 5 is a schematic view, in cross section, of the shape of an example of a corrugated stiffener according to the invention, obtained by the method according to the invention.

A corrugated stiffener 13 as represented in FIG. 5 is obtained in a single step of plastic deformation. This stiffener exhibits exactly the shapes of the die 17 without having undergone any elastic return after deformation. By tensile tests and hardness tests made on one of them it is found that the mechanical characteristics of a stiffener formed in this way are the following: tensile strength greater than 1000 MPa; 0.2% yield strength greater than 700 MPa; elongation at break greater than 20%; hardness greater than 390 HV. Such a corrugated stiffener 13 may be mounted directly in a foil bearing without necessitating any supplementary step of heat treatment, neither for forming nor for machining, the corrugated stiffener 13 being able to be produced, according to the invention, in a single step of plastic deformation by stamping at high energy directly to the shapes and dimensions appropriate for its mounting in the foil bearing.

The same test is realized with a metallic piston 20 of 200 g at a speed of impact on the punch 16 of about 520 m/s—that is to say, a deformation energy equal to 30 kJ within a period equal to about $10^{-5}$ s. An improvement is found of the overall (cylindrical) shape of the stiffener in comparison with the preceding test. The invention may be the subject of numerous practical variants and of various applications in relation to the embodiment given by way of example above and represented in the figures. In particular, the plastic deformation of the sheet 15 may be obtained other than by a dynamic impact of a piston under the influence of an electromagnetic device. In particular, the piston 20 may be driven by a device of the swage-hammer type, or with explosion in the manner of a heat engine; the plastic deformation may even be obtained by generation of a gaseous explosion directly within the sheet 15 in the die 17 etc. Instead of a piston pounding the punch against the bottom of the die 17, use may be made of two pistons driven axially in opposite directions against the two axial ends of the punch, the bore of the die being a through-bore. The energy of plastic deformation and the period of impact, as well as the choice of the superalloy, may vary as a function of the applications and of the characteristics being sought for the corrugated stiffener of the foil bearing.

The invention claimed is:

1. A method for producing a corrugated foil-bearing stiffener, comprising:
   providing a sheet (15) of nickel-based austenitic metallic superalloy exhibiting a yield strength greater than 500 MPa; and
   subjecting the sheet (15) to at least one step of plastic flexural deformation by stamping along an entire thickness of the sheet with a deformation energy greater than 10 kJ within a period shorter than $10^{-5}$ s, so as to create flexural corrugations,
   wherein in the course of said at least one step of plastic flexural deformation, the sheet (15) is subjected to a deformation energy of less than 35 kJ within a period longer than $10^{-10}$ s,
   wherein the sheet (15) is wound in the form of a cylindrical solid of revolution between an external die (17), exhibiting an internal cylindrical face (18) endowed with patterns (19) in the form of troughs corresponding to the corrugations to be formed, and a cylindrical punch (16) consisting of rubber elastomer, and
   wherein said cylindrical punch (16) is axially compressed, the radial expansion of the cylindrical punch (16) bringing about the radial stamping of the sheet (15) in the die to form said flexural corrugations.

2. The method as claimed in claim 1, wherein the sheet (15) is nickel-based austenitic metallic superalloy exhibiting a yield strength greater than 700 MPa, a tensile strength greater than 1000 MPa, and an elongation at break greater than 20%.

3. The method as claimed in claim 2, wherein the sheet (15) is nickel-based austenitic metallic superalloy comprising between 5% and 9% iron, more than 70% nickel and cobalt, of which at most 1% is cobalt, between 14% and 17% chromium.

4. The method as claimed in claim 2,
wherein the sheet (15) is planar with a thickness between 0.05 mm and 0.4 mm, and
wherein flexural corrugations are produced having a height of each corrugation of between 0.2 mm and 1 mm, a length of each corrugation of between 3 mm and 10 mm, and a pitch between the corrugations of between 4 mm and 10 mm.

5. The method as claimed in claim 2, wherein in the course of said at least one step of plastic flexural deformation, a coupling fold (23) is also realized, forming an outer edge (22) of the stiffener (13).

6. The method as claimed in claim 2, wherein the sheet (15) is deformed by stamping in a direction at least normal to the sheet.

7. The method as claimed in claim 1, wherein the sheet (15) is nickel-based austenitic metallic superalloy comprising between 5% and 9% iron, more than 70% nickel and cobalt, of which at most 1% is cobalt, between 14% and 17% chromium.

8. The method as claimed in claim 7, wherein the nickel-based austenitic metallic superalloy has less than 0.08% carbon, less than 0.3% manganese, less than 0.5% silicon, less than 0.01% sulfur, between 0.4% and 1% aluminum, between 2.25% and 2.70% titanium, less than 0.5% copper, and between 0.7% and 1.2% niobium and tantalum.

9. The method as claimed in claim 7,
wherein the sheet (15) is planar with a thickness between 0.05 mm and 0.4 mm, and
wherein flexural corrugations are produced having a height of each corrugation of between 0.2 mm and 1 mm, a length of each corrugation of between 3 mm and 10 mm, and a pitch between the corrugations of between 4 mm and 10 mm.

10. The method as claimed in claim 1,
wherein the sheet (15) is planar with a thickness between 0.05 mm and 0.4 mm, and
wherein flexural corrugations are produced having a height of each corrugation of between 0.2 mm and 1 mm, a length of each corrugation of between 3 mm and 10 mm, and a pitch between the corrugations of between 4 mm and 10 mm.

11. The method as claimed in claim 1, wherein in the course of said at least one step of plastic flexural deformation, a coupling fold (23) is also realized, forming an outer edge (22) of the stiffener (13).

12. The method as claimed in claim 1, wherein the sheet (15) is deformed by stamping in a direction at least normal to the sheet.

13. The method as claimed in claim 1, wherein said cylindrical punch (16) is axially compressed with the aid of at least one piston (20) having a mass greater than or equal to 200 g, which is driven axially at a speed greater than 10 m/s.

14. A method for producing a foil bearing, comprising:
producing a corrugated stiffener by implementation of the method as claimed in claim 1, with a shape and dimensions configured for mounting directly in the foil bearing; and
mounting the produced corrugated stiffener in the foil bearing.

* * * * *